H. C. J. DEEKS.
COLOR PHOTOGRAPHY.
APPLICATION FILED OCT. 11, 1916. RENEWED APR. 9, 1921.

1,430,060.                                                                 Patented Sept. 26, 1922.

INVENTOR
Hiram C. J. Deeks
BY
Emery, Booth, Janney & Varney
ATTORNEY

Patented Sept. 26, 1922.

1,430,060

UNITED STATES PATENT OFFICE.

HIRAM C. J. DEEKS, OF SEA CLIFF, NEW YORK, ASSIGNOR TO AMERICAN RAYLO CORPORATION, OF NEW YORK, N. Y., A CORPORATION OF DELAWARE.

COLOR PHOTOGRAPHY.

Original application filed June 25, 1914, Serial No. 847,298. Renewed November 9, 1920, Serial No. 422,969. Divided and this application filed October 11, 1916, Serial No. 124,951. Renewed April 9, 1921. Serial No. 459,978.

*To all whom it may concern:*

Be it known that I, HIRAM C. J. DEEKS, a citizen of the United States, and a resident of Sea Cliff, in the county of Nassau and State of New York, have invented an Improvement in Color Photography, of which the following is a specification.

This application is filed as a division of my earlier one, filed June 25, 1914, Serial No. 847,298, renewed November 9, 1920, Serial No. 422,969. The latter application relates to what I call my "color sheet," it being referred to in my earlier application as the "celluloid sheet" and there shown as a single sheet of celluloid upon which three color positives are made from the usual selective color negatives.

In the present drawings.

Figure 1:
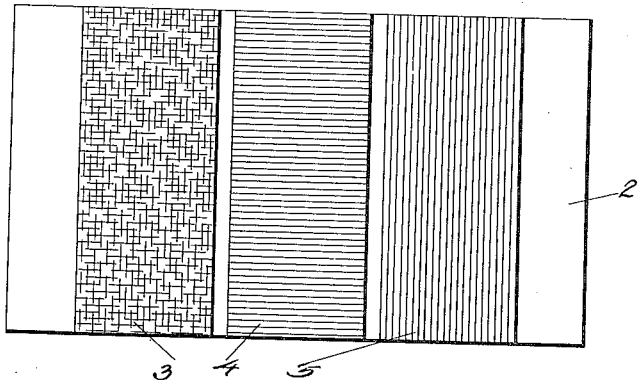
Figure 1 is a plan view of my color sheet before it has been printed.
Figure 2:
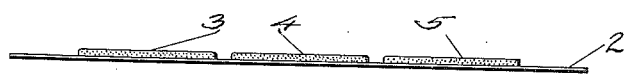
Figure 2 is an edge view of the same, the thickness of the color film being exaggerated for better illustration.

Each color sheet comprises a base 2 and sensitizable film material 3, 4, 5, spread on one face thereof and containing particles of coloring matter (indicated by black dots in Figure 2). If the film material be gelatine, glue or some other organic substance of like nature, it may be sensitized, as I prefer, with a bichromate solution and printed in the well-known manner.

Since it is one of the important advantages of my invention that the three color positives, contrary to what has been the prior practice, may all be made and retained upon the same sheet or plate, I have so illustrated the invention; although it will be possible, if for any reason it were desired, to make each color positive on a separate sheet; hence my invention is not limited to placing the three color films on the same sheet except in so far as the claims hereinafter specify.

From the specification of my earlier application, it will appear that the color sheet after being sensitized, printed and developed is to be used to impart in succession upon a surface suitable to produce the final colored picture, each of the three color components which are, by such process, transferred to said surface, one over the other, and in exact registration. To realize this, I embodied the colors in the specially prepared pigments which I described in my earlier application, that is to say, pigments which would allow the color to be transferred quickly from the surface of my color sheet to that of the final picture, when I was ready to do it, but which would remain unaffected during the sensitizing, printing and developing of the color sheet or whatever prior treatment was employed to make ready for the transfer.

An important desideratum was to produce a color sheet in which all the coloring could be done in advance for the user and which, when a picture had been printed and developed thereon, might be used to transfer the color as above referred to; and one difficulty was to get a pigment which could be transferred in this manner and yet one which at an earlier stage would not alter the gelatine or other sensitive film on the color sheet by reacting with the sensitizer, and would not dissolve out or "run" during the developing of the film.

As one means for accomplishing the result sought I disclosed the use, as the base of the coloring matter, suitable dyestuffs which in the last step are available for stamping, applying or imparting the color as stated, and providing a protective medium for the dyestuffs so that the color is virtually locked up during intermediate steps, such as while the film is being sensitized, printed and developed. When finally the composite picture is to be produced, the dyestuff is released by the action of a suitable transfer agent which cuts through the protective medium and absorbs the color.

The protective medium which I prefer to use is gum sandarac and in using it I prefer to make a solution of this gum in alcohol and then add a dyestuff having the proper color (preferably a basic dyestuff soluble in alcohol); this solution is then conveniently sprayed in any suitable way into a closed chamber where the solvent is evaporated and the residue settles to the floor in a finely divided condition and is collected as a fine colored powder. This powder is then preferably washed by means of a filter press and stored, ready for use, in the form of a paste. The latter consists of minute particles of colored gum which are not affected by the sensitizing solution nor the developing bath; nor will they combine with the gelatine or other organic matter of the sensitizable film other than to form a mechanical mixture therewith. For convenience to distinguish from the terms "coloring matter" and "dyestuff" as used throughout the specification and claims, I call this paste, and the powder obtained by spraying the colored gum solution, a "pigment" or "color pigment."

These pigments are prepared preferably in three colors, for example magenta, blue, and yellow, which are complementary to the three primary colors employed in the first instance in making the negatives. For magenta, I preferably use rhodamine; for blue, a mixture of methylene blue and brilliant green; and for yellow, auramine. These dyestuffs I combine respectively with gum sandarac or other suitable substance to produce my pigments.

Having produced the pigments, each is incorporated with a suitable film-forming material such as a solution of gelatine in warm water to which has preferably been added a small quantity of sugar or corn syrup to prevent cracking of the film when dry. The gelatine itself in these solutions cannot be said to be dyed; the color in the pigments is not released. While the gelatine solutions appear colored neither these solutions nor the colored films produced therefrom are transparent; the coloring matter is held in suspension therein in a finely divided condition.

The mounting of the base 2 to produce the sensitizable film may be done in any suitable way. Where three colors are used, in accordance with the process described in my earlier application; a sheet of transparent celluloid is preferably stretched tightly and fastened in a metal frame 1, and then placed upon a levelling stand. The surface is divided laterally into three portions and the gelatine containing the coloring matter is then flowed over the sheet by pouring thereon the required quantity and spreading evenly; the magenta solution over one portion 5, the blue over another 3 and the yellow over the third 2. The composite film thus produced, after having become set and dried, may be kept for a considerable length of time without deterioration; and when required for use is sensitized in suitable manner as for example by immersing it in a say three per cent solution of potassium bichromate or other sensitizer and then drying in the dark. It is obvious that a more expeditious way to prepare a large number of these color sheets is to provide a suitable coating machine in which a large sheet of celluloid may be coated at one time and thereafter cut up into appropriate sizes.

The base or back 2 of the color sheets, however, need not be celluloid or even transparent, although it is preferably transparent. My reason for using a transparent base is that in printing the sensitive film I may print through the base so that the portion of the film next to the base will be the first to be acted upon by the light. In this way, practically all of the gelatine next to the base is rendered insoluble and is thus made to adhere firmly to the base instead of dissolving or soaking away therefrom when the color sheet is developed. This is of particular importance in securing accurate registry in the final transfer from the color sheet, for it insures against warping, spreading or distortion of the color films during developing and before they are ready for the transfer.

In Figure 2 of the drawings, the particles of coloring matter in the sensitizable film are indicated by black dots. The effect of distributing the coloring matter throughout the film is to destroy the transparency of the film so that, in appearance, the color sheets present a transparent base on one side and three non-transparent sections of colored film on the other side.

Figure 3:
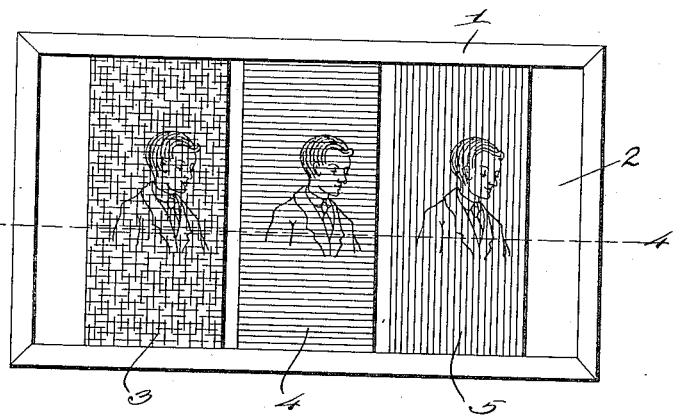
Figure 3 is a view similar to Figure 1 and Figure 4 a section thereof, showing the color sheet after being printed and developed and with its printing-frame support.
Figure 4:
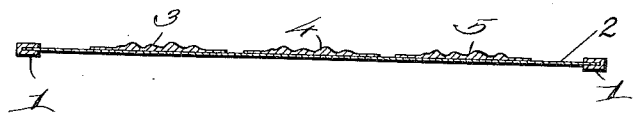

In Figs. 3 and 4, the color sheet is shown as mounted in the frame 1 after it has been printed and developed. It is now ready for the final transfer, that is to say, for the release of the color to form the composite picture in the manner already referred to.

My invention avoids the necessity (1) of tinting one or more colored positives to produce the required color, or (2) superimposing two or more colored positives upon each other and fastening them together in order to produce the final composite print. By means of my color sheets I am able to do away entirely with the tinting because this is all provided for in the color sheets themselves prior to printing the image thereon, and they may be sensitized, printed and developed without affecting the color at all and hence do not have to be severally tinted after being printed and developed; and I am also able to do away with the superimposing and fastening together of separate colored films because the coloring matter in my color sheets is releasable and therefore each colored positive in succession, as I have explained in my earlier application, may be made to impart its component of color on the ultimate film or base and thus produce the final composite colored picture.

The result is that the use of my color sheets enables the unskilled amateur to make color photographic prints which heretofore, on account of the practical difficulties presented by registration and tinting and by the necessity of superposing and fastening together of one or more films, has confined the art to a few who had the necessary skill and ability to meet these conditions.

While I have described my "color sheet" as being used in connection with the transfer process hereinbefore described whereby, after said sheet has been printed, it is used to impart or transfer color to another film or surface to produce the finished picture, my invention is not limited to such use, nor, indeed, to any particular manner of use. It is possible for example, if desired, to produce colored photographs from my color sheets by superposing the three colored films (after printing) and fastening the same together; and as it may be desirable to use my color sheet in this way, the claims hereinafter following should be construed accordingly.

I claim as my invention:

1. A color sheet for making colored photographic positives for subsequent transfer by a suitable agent, said sheet comprising a base and a sensitizable medium thereon containing a dyestuff soluble in said agent, and a protective material associated with said dyestuff also soluble in said agent but inert to the treatment to which the color sheet is subjected to prepare it for the transfer, whereby the pigment produced by the combined dyestuff and protective material will neither affect nor be affected by said treatment but will yield to the transfer agent.

2. A color sheet for making colored photographic positives for subsequent transfer by a suitable agent, said sheet comprising a transparent base and a gelatine film thereon containing a dyestuff and a protective material associated with said dyestuff also soluble in said agent but inert to the action of the sensitizer and developer, whereby the pigment produced by the combined dyestuff and protective material will neither affect nor be affected by said sensitizer and developer but will yield to the transfer agent.

3. A color sheet for making colored photographic positives for subsequent transfer by a suitable agent, said sheet comprising a base and a sensitizable medium thereon containing a pigment insoluble in said base and in the sensitizer and developer therefor but soluble in said transfer agent.

4. A color sheet for making colored photographic positives for subsequent transfer by a suitable agent, said sheet comprising a transparent base and a gelatine film thereon containing a pigment insoluble in said film and also in the sensitizer and developer therefor but soluble in said transfer agent.

5. A color sheet for making colored photographic positives comprising a base and a sensitizible medium thereon containing an alcohol soluble dyestuff and an alcohol soluble material associated therewith, said material being insoluble in the sensitizer and developer for said sheet, thereby to isolate said dyestuff from the action of the sensitizer and developer.

6. A color sheet for making photographic positives, comprising a base and a sensitizible medium thereon containing an alcohol soluble colored gum, said gum being insoluble in the sensitizer and developer for said sheet thereby to prevent any reaction with the sensitizer or developer.

7. A color sheet for making colored photographic positives, comprising a base and a sensitizible medium thereon divided into a plurality of sections arranged side by side and each of which contains an alcohol soluble dyestuff of a color different from those of the other sections and an alcohol soluble material associated with said dyestuff, said material being insoluble in the sensitizer and developer for said sheet, thereby to isolate it from the action of the sensitizer and developer.

8. A color sheet for making colored photographic positives, comprising a transparent base, a gelatine film thereon divided into a plurality of sections arranged side by side and each of which contains an alcohol soluble colored gum of a color different from those of the other sections, said gum being insoluble in the sensitizer and developer for said sheet thereby to prevent any reaction with the sensitizer or developer.

9. A color sheet for making photographic prints, said sheet comprising a base and a sensitizible medium thereon containing particles of colored gum insoluble in water.

10. A color sheet for making photographic prints, said sheet comprising a base and a sensitizible medium thereon containing a soluble dyestuff combined with a substance capable of protecting the dyestuff from the action of the sensitizer and developer.

11. A color sheet for making colored photographic prints, said sheet comprising a transparent base and a sensitizible medium thereon containing a soluble dyestuff combined with a gum insoluble in water.

12. A color sheet for making colored photographic prints, said sheet comprising a base and a sensitizible medium thereon divided into a plurality of sections arranged side by side, each of said sections containing a soluble dyestuff of a color different from those of the other sections and combined with a substance capable of protecting the dyestuff from the action of the sensitizer and developer.

13. A color sheet for making photographic positives, comprising a base carrying thereon a sensitizible medium containing dye colored particles insoluble in the liquids used for sensitizing and developing said sheet.

14. A color sheet for making photographic positives comprising a base carrying thereon a sensitizible medium divided into three sections arranged side by side, each section containing dye colored particles of a color different from those of the other sections, and said particles being insoluble in the liquids used for sensitizing and developing said sheet.

In testimony whereof, I have signed my name to this specification this 9th day of October, 1916.

HIRAM C. J. DEEKS.